Figure 1:
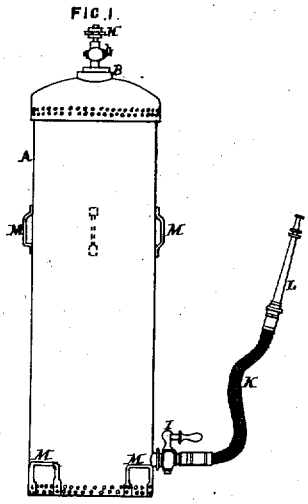

2 Sheets--Sheet 1.

P. F. CARLIER & A. A. C. VIGNON.

Improvement in Extinguishing Fires.

No. 4,994. Reissued July 16, 1872.

Witnesses
Wm H Nichols
Wm Scott.

Dawson Miles, adm.
A. A. C. Vignon
by their attorney
W. H. H. Keller

2 Sheets--Sheet 2.

P. F. CARLIER & A. A. C. VIGNON.

Improvement in Extinguishing Fires.

No. 4,994. Reissued July 16, 1872.

Witnesses,
W. H. Bishop
Wm. Scott.

Dawson Miles, adm.
a. a. c. Vignon
by their attorney
Chas. M. Keller,

UNITED STATES PATENT OFFICE

DAWSON MILES, OF CAMBRIDGE, MASSACHUSETTS, ADMINISTRATOR OF P. F. CARLIER, DECEASED, AND ALPHONSE A. C. VIGNON, OF PARIS, FRANCE.

IMPROVEMENT IN EXTINGUISHING FIRES.

Specification forming part of Letters Patent No. 88,844, dated April 13, 1869; reissue No. 4,994, dated July 16, 1872.

*To all whom it may concern:*

Be it known that the late PHILIPPE FRANÇOIS CARLIER, of Paris, in the Empire of France, doctor of physics, and ALPHONSE A. C. VIGNON, ex-general officer of the corps of engineers, in the Empire of France, also of Paris, in the French Empire, invented certain Improvements in the Art of Extinguishing Fires, and in the means and apparatus employed in such art, of which the following is a full, clear, and exact description, reference being had to the drawing annexed hereto.

This invention has for its object the extinguishing of fires in a more instantaneous and effectual manner than is attainable by means in present use; and consists, first, in the process or method of extinguishing fires by means of a jet or stream of mingled water and carbonic acid ejected from a closed vessel in a suitable direction by means of the pressure or expansive force of the mixture contained in the vessel; and, secondly, in the construction of apparatus for containing and delivering this extinguishing medium, which apparatus may be made of an exceedingly portable nature, and kept always charged and ready for use at a moment's notice at the particular locality which it is desired to protect.

The particular advantages to be derived from the employment of this improved system for extinguishing fires may be shortly stated, as follows: It has been found from experience that nearly every conflagration commences on a very small scale, and that its rapid and uncontrollable increase is owing either to the fact of the locality where it originates being inaccessible to the means and apparatus employed, or to the fact that at the time of commencement of the fire (when every moment's delay in checking it is of the utmost importance) no such means or apparatus are ready at hand for use. Now, with a view to remedy these evils, advantage has been taken of the known facts, first, that water, when confined in a closed vessel, will dissolve or absorb carbonic-acid gas, a non-supporter or extinguisher of combustion of a much more powerful nature even than water, to an almost unlimited extent without perceptibly increasing its weight or bulk; and, secondly, that the carbonic-acid gas, when so held in solution in considerable quantities by water in a closed receptacle, will exert an exceedingly powerful pressure, which, on allowing the mixture to escape from the vessel, will cause a stream of it to be propelled with great force to a considerable distance.

By virtue of the above-named properties, therefore, one is enabled, first, to employ vessels containing a comparatively small quantity of the above-named mixture, and consequently of an exceedingly portable nature, but yet representing a volume of fire-extinguishing material many times greater than the actual contents of the vessel; secondly, by keeping such vessels ready charged on the premises, one is enabled to make use of them at a moment's notice by simply turning a cock or opening a valve, when the self-contained projective force of the carbonic-acid gas will cause a stream of the mixture or mass of water containing carbonic acid to be propelled to a considerable distance through a hose and nozzle upon the fire.

In order that the great efficacy of the system may be fully understood it is only necessary to mention that water will absorb about one and a half times its own volume of carbonic-acid gas for every additional atmospheric pressure of fifteen pounds on the square inch to which it is subjected, and that, consequently, a quantity of, say, six gallons of water contained in a closed vessel (a quantity that can with ease be carried on the back of a person) will absorb, under a pressure of, say, six atmospheres, (or about ninety pounds on the square inch,) about nine times its own volume of carbonic-acid gas, and will therefore actually represent a quantity of sixty gallons of extinguishing mixture of a more efficacious nature than that quantity of water alone, and which, on opening the cock or valve of the vessel, may be projected from a distance of about thirty-eight feet upon a burning object by the pressure of the gas alone.

It will be evident, therefore, from the foregoing, that if any number of such portable apparatus containing in a condensed form ten times their volume of the extinguishing solution—that is, nine volumes of gas and one of water, ready to be made use of at a moment's notice—be placed in buildings or on board ships, at or near the various localities which it is particularly desired to protect from fire, then, in the case of a fire breaking out, not only is the most efficient means for checking the same ready to hand, but also, if the place where the fire originates is inconvenient to get at, such as the roof or cellar of a house, or a hold of a ship, one or more persons may fasten the before-described apparatus on his back, or their backs, and may climb or crawl to the otherwise inaccessible place and extinguish the fire before it has time to spread.

We are aware that it is not new to employ carbonic-acid gas, or other gases that are non-supporters of combustion, as a means of extinguishing fires; but such gases have always been employed by themselves, and have, consequently, not been efficacious, first, on account of the difficulty of confining the gas around the fire, even if it could be properly directed thereto; and, secondly, because a jet of such gas alone, even if projected with the greatest available force from the vessel containing the same, would, on account of its want of mass or body, almost immediately lose its momentum on passing into the atmosphere, and could not be thrown from any distance onto a burning object. Now, by the employment of this invention, the carbonic-acid gas which is held in solution in the water without at all losing its characteristic properties is, on the solution being allowed to escape from the vessel, carried along with the jet of water in a proper direction, and, if necessary, to a considerable distance, with such a velocity that it arrives at the burning locality against which it is directed without any material quantity of the same having escaped on its passage, and on being liberated suddenly when the jet of water strikes the burning object, it surrounds the latter with an atmosphere of carbonic-acid gas, which, in combination with the water itself, effectively operates in extinguishing the fire, the water, in fact, acting as a vehicle for transmitting or conveying the gas. Although it is preferable to employ small portable vessels for containing this solution that may be readily moved from place to place, yet in some cases the same may be arranged as stationary receptacles situated at or near the localities which it is desired to protect, and then they may be made of any desired capacity; or, in other cases, the apparatus may be contrived to move on wheels. We prefer that the gas should be generated and dissolved in the water in the vessel itself which is to contain the solution by introducing ingredients, such as are well known, into the vessel that in combination with the water will disengage carbonic-acid gas. The portable apparatus is preferred, and may be arranged as shown on the accompanying drawing.

Figure 2:
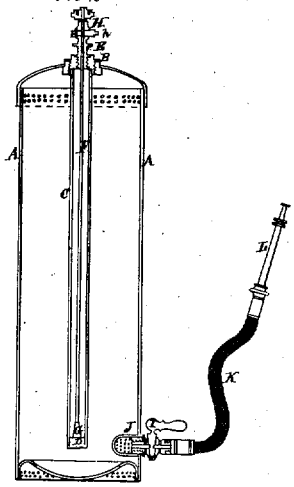
Figure 3:
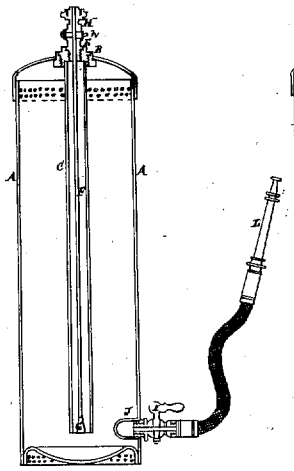

Figure 1 shows an elevation. Figs. 2 and 3 show longitudinal sections through such an apparatus.

Similar letters of reference indicate similar parts in all the figures.

A is a casing or vessel made of sheet-steel or other suitable material capable of withstanding considerable pressure with a comparatively small thickness, so as to render the apparatus as light as possible. For portable apparatus it is preferable to make this vessel of such a size that it will contain about six gallons of water, more or less. Its form is here shown cylindrical, with slightly spherical ends, as being the most convenient for use; but it may receive any other form that will effectually withstand internal pressure. This casing has an aperture at top, into which is screwed a plug, B, having attached to it a cylinder, C, closed at the bottom by a cork, D. The plug B has also an aperture, into which is screwed a second plug, E, to the lower end of which is attached a metal rod, F, having a button, G, at its extremity. To the upper end of this plug E is fixed a perforated stem, H, having a stop-cock, *h*, and arranged at top to receive a pressure-gauge. The perforation passes through the plug E, as shown, and communicates with the interior of the vessel A, so that when the pressure-gauge is screwed onto the stem H, and the cock *h* is open, the pressure-gauge will indicate the pressure existing inside the casing. At the lower extremity the casing or vessel A is provided with a stop-cock, I, the inner opening of which is covered by a perforated shield, J, in order to prevent any solid substances from entering the same. Upon the outer end of the stop-cock is fixed a length of flexible tubing or hose, K, having a suitably-formed delivery-nozzle, L, attached to it. To the exterior of the casing A are fixed handles or loops M M, serving either to carry the apparatus by or to receive the hooks of shoulder-straps, so as to be slung on the back of a person.

The mode of charging the apparatus is as follows: The plug B being removed, the vessel A is filled with water, to which is added one of the ingredients employed in generating carbonic-acid gas, such as bicarbonate of soda. The tube C being held in a reversed position, and the plug E and rod F being in the position as shown in Fig. 2, it is filled with the other of the ingredients employed for generating carbonic-acid gas, such as tartaric acid. The open end of the tube is then closed with the cork D, and it is inserted in the vessel A, the plug B being screwed into the opening of the same, as shown. If required, a pressure-gauge is fixed to the stem H of the plug E, and this latter is then screwed down into the position as shown at Fig. 3, by which the button G at the end of the rod F will have pushed out the cork D, and, the water penetrating into the tube C and mixing with the ingredients contained therein, carbonic-acid gas will be generated in great quantities, and will be taken up or dissolved by the water to an extent and at a pressure corresponding with and depending on the quantity of ingredients employed for generating the same.

In the portable apparatus just described such quantities of the ingredients may be employed as will generate a pressure of about six atmospheres, or about ninety pounds to the square inch, when, as before stated, the water will absorb the carbonic-acid gas in the proportion of about nine volumes of gas to one of water, and this pressure will be effective in discharging a stream of water containing gas as soon as the stop-cock is opened.

The apparatus, as described, may be made ornamental externally, and placed, ready charged, at or near the locality which it is desired to protect from fire.

Figure 4:
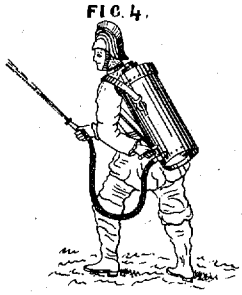

If a fire occurs the apparatus is slung upon the back of a person by means of shoulder-straps, as shown at Fig. 4, and he, regulating the opening of the cock with the left hand, as shown, directs the delivery-nozzle with his right hand and causes the contents of the apparatus to be thrown in a stream upon the burning object, when the exceedingly-energetic action of the carbonic-acid gas combined with that of the water will speedily and most effectually extinguish the fire.

Figure 5:
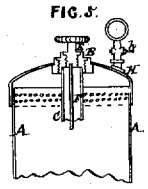

In some cases, instead of fixing the pressure-gauge to the top of the plug E, as described, it may be arranged as shown in Fig. 5, where the plug E is not perforated, and a separate tube, H, with the cock *h*, is provided, into which the pressure-gauge is screwed. The object of the pressure-gauge is principally to ascertain, from time to time, whether the requisite pressure is still maintained in the vessel, so as to render it fit for instantaneous use, as without this precaution a leakage, if ever so small, might occur unknown, and the gas might nearly all escape, so as to render the apparatus useless when it was wanted. If, however, the requisite ingredients were kept ready at hand, even in such a case this defect might be quickly remedied by the introduction of fresh materials for generating the gas.

Figure 6:
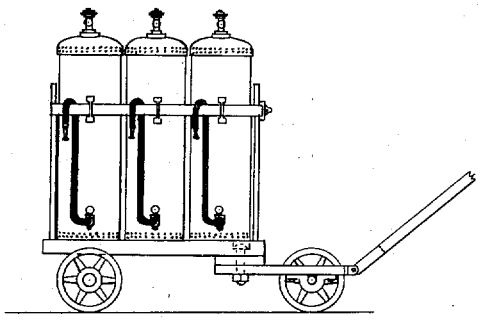
Figure 7:
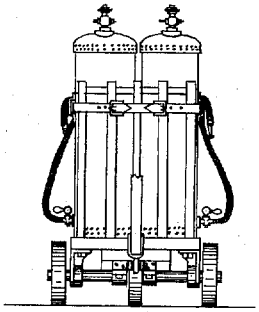

Sometimes several of the before-described apparatus are arranged upon a truck running on wheels, as shown at Figs. 6 and 7, which show, respectively, a front view and an end view of the truck. The apparatus may either be made use of while on the truck or they may be removed from the same and carried on the back, as described; or, instead of having several small apparatus on a truck, one large one, placed upon wheels and furnished with one or more delivery-hose, may be used.

Figure 8:
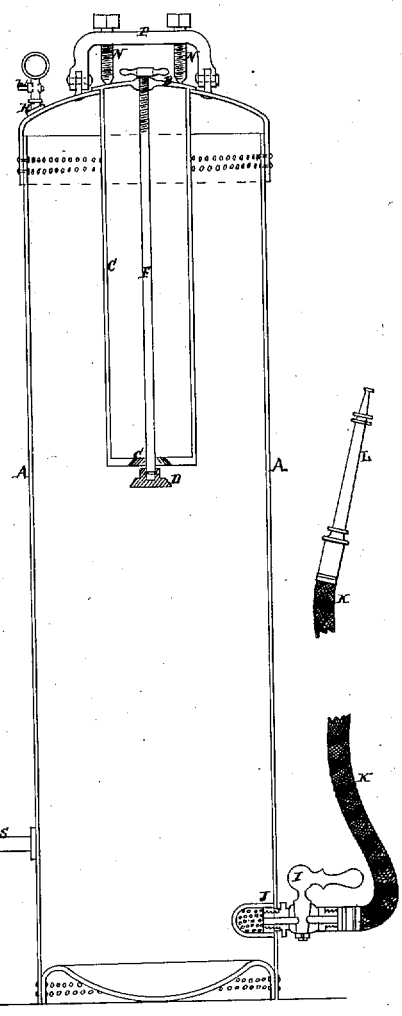

Fig. 8 shows the arrangement which is preferred to be employed as a stationary apparatus, fixed at or near the locality which it is desired to protect from fire. The general arrangement of the same is similar to that of the portable apparatus before described, the principal difference being that it is of much larger dimensions, and that the details require, in consequence, to be somewhat differently arranged.

A is the casing, of sheet-steel or other suitable material, for withstanding considerable pressure. It has an opening at top, which is closed by a suitable lid, B, pressed down over the opening by means of the screws N N, working in the bridge-piece P, which are the equivalents of the plug B. To this lid is attached the tube or cylinder C, for containing one of the ingredients for generating carbonic-acid gas, which tube has an opening, *c*, at bottom, capable of being closed by the valve D fixed to the rod F, working up and down in a threaded hole formed in the cover. The valve D is the equivalent of the cork D. The bridge-piece P is formed with hinges, so as to turn down and enable the tube C to pass out of the casing. I is the outlet-cock, of which there may be more than one. K is the flexible hose, and L the delivering-nozzle. Q is the pressure-gauge.

In charging this apparatus the tube or cylindrical vessel C is removed, and the vessel A is filled with water in which one of the ingredients for generating carbonic-acid gas is dissolved. The tube C is then filled through the opening *c* with the other ingredients, and the valve D being closed it is placed into the vessel A again, the cover B being pressed tightly onto its seat by the screws N N. The rod F is then screwed down so as to open the valve D, as shown, when the generation and absorption of carbonic-acid gas will take place, as already described with reference to the other arrangement.

The rod F is in both the portable and fixed apparatus a rod which slides or moves endwise in the outer casing, and by means of it power exerted outside the vessel may be transmitted to the interior thereof in such manner as to cause the escape of the contents of the inner vessel, thereby mingling the ingredients, which, when mingled, generate carbonic-acid gas.

Such fixed apparatus may be made of any suitable dimensions or form, according to the requirements of the localities where it is to be employed. If the apparatus is of so great a capacity that the pressure in the same would vary very considerably during the discharge of the solution, in that case it is preferred to employ an auxiliary apparatus, as shown at R, connected at the casing A by means of a tube and stop-cock, S. This auxiliary apparatus serves to generate carbonic-acid gas, which is allowed to pass into the main apparatus during the time that the latter is in action, in order to maintain the requisite pressure in the same up to the end of the discharge. The auxiliary apparatus may, for this purpose, be made of about one-thirtieth of the capacity of the main apparatus, and it is provided with a tube, T, for containing one of the ingredients, a valve, U, and valve-rod V, attached to the screw-plug, as also a perforated stem, Y, for a pressure-gauge, as described with reference to the other apparatus. It is only filled to such an extent with water as will effectually cause the greatest possible amount of the carbonic-acid gas to be evolved. Besides serving to replenish the main apparatus with gas during action, this auxiliary apparatus may also be employed to supply the former with gas while charging, by which the water would be agitated, and thereby the absorption of the gas by the same facilitated. The cock X in the auxiliary apparatus serves to discharge the water from the same after action.

The above-described improved means and apparatus, whether portable or fixed, may be with great advantage applied on board ships, particularly where these are divided into water-tight compartments; and they may, in such cases, be effectually made use of to check spontaneous combustion in the hold or other part of the vessel, by leading one or more tubes from the apparatus to such locality, and connecting them there to other tubes provided with numerous perforations, and arranged in a zigzag manner over the space which it is required to protect. Then, if it is suspected that spontaneous combustion is taking place among the materials stowed in the hold, by opening the communication between the apparatus containing the solution of water and carbonic-acid gas at a high pressure and the perforated tubes placed in such locality, the mixture will pass with considerable force through the perforated tubes, and the energetic action of the carbonic-acid gas, together with that of the water, will immediately and effectually check the spontaneous combustion and extinguish any ignited portions, and the carbonic-acid gas, being considerably heavier than the atmospheric air, will displace the latter from that compartment of the hold, and, thus preventing the access of oxygen to the materials, will protect them from further spontaneous combustion.

Having now described the nature of this invention, and the best means of performing the same, we wish it to be understood that we in no way limit ourselves to the precise arrangements, forms, and dimensions of apparatus for preparing, containing, and delivering the solution as hereinbefore described with reference to the accompanying drawing; neither to any particular ingredients for or method of preparing the solution of carbonic-acid gas in water; nor do we claim the use of carbonic-acid gas when employed by itself for extinguishing fires; but

What we claim is—

1. The improvement in the art of extinguishing fires, hereinbefore described, by throwing upon the fire or conflagration a properly-directed stream of mingled carbonic-acid gas and water by means of the pressure or expansive force exerted by the mass of mingled gas and water from which the stream is derived.

2. We claim a strong vessel, provided with a proper plug or lid, by which an orifice in it can be closed, and a stop-cock, through which its contents can be ejected, and a flexible tubing or hose for directing the stream as ejected at the will of the operator, these parts being substantially such as described, and capable of operating as specified.

3. We claim a strong vessel, provided with a proper plug or lid for closing an orifice in it, and also with a stop-cock, in combination with another vessel or tube, the combination being substantially such as specified, and the construction being substantially such as described, so that the vessels may keep separately the ingredients for making carbonic-acid gas, and that when their contents are mingled they may be discharged in a stream of carbonic-acid gas and water.

4. We claim, in combination with the vessel's lid or plug and stop-cock combined, and capable of operating as in the above third claim, a hose and nozzle, so applied, as described, that the mingled stream of carbonic-acid gas and water may be suitably directed, as hereinbefore set forth.

5. As the preferred arrangement of our apparatus, we claim a strong vessel provided with a lid or plug and a stop-cock near the bottom thereof, in combination with a vessel or tube arranged in the interior thereof, the arrangement being substantially as described.

6. We claim a strong vessel, provided with a lid or plug and a stop-cock, in combination with a vessel or tube arranged in the interior thereof, and a rod passing through the wall of the outer vessel, and capable of operating substantially as described.

7. We claim a strong vessel, provided with a lid or plug and a stop-cock, in combination with a vessel or tube arranged in the interior thereof, and a rod and cork or valve, the whole being and operating substantially as described.

8. We claim the elements or parts of a whole apparatus specified in the fifth claim, and arranged as therein specified, in combination with a flexible hose and nozzle, and with handles or loops, whereby the apparatus may be supported and the stream directed, substantially as specified.

9. We claim, in combination, a strong vessel, a lid or plug for closing the same, a stop-cock near the bottom of the vessel, a hose and nozzle, and handles or loops, whereby a volume of water charged with carbonic-acid gas may be confined and transported, and a stream thereof directed in the manner and for the purposes described.

10. The keeping of the acid and alkali or alkaline solution in separate and distinct vessels, but in such proximity to each other that they may be immediately brought into contact when the apparatus is required for use, one mode of accomplishing which we have above set forth.

11. A closed receptacle, made of suitable material, containing one of the gas-generating ingredients, placed within the main reservoir containing the other gas-generating ingredient, to be discharged of its contents in the manner herein set forth, or by other equivalent means.

DAWSON MILES,
*Administrator of the estate of Phillippe F. Carlier.*
ALPH. VIGNON Witnesses to the signature of DAWSON MILES:
GEO. F. PINKHAM,
L. W. LOVELL.

Witnesses to the signature of A. A. O. VIGNON:
H. DEGIEZ,
G. JAHAND.